United States Patent [19]
Skinner

[11] 3,893,211
[45] July 8, 1975

[54] STUD-AND-SOCKET FASTENER

[75] Inventor: Edward Albert Skinner, Hatfield, England

[73] Assignee: Aerpat A.G., Zug, Switzerland

[22] Filed: Feb. 5, 1974

[21] Appl. No.: 439,726

[30] Foreign Application Priority Data
Feb. 5, 1973 United Kingdom.............. 5695/73

[52] U.S. Cl..... 24/221 K; 24/221 R X; 24/221 K X
[51] Int. Cl. ........................................... A44f 17/00
[58] Field of Search .......... 24/73 SA, 73 SC, 221 L, 24/221 R, 221 K, 216, 217, 109, 221 A

[56] References Cited
UNITED STATES PATENTS

| | | | |
|---|---|---|---|
| 2,660,775 | 12/1953 | Bielkowicz............... | 24/221 A |
| 3,718,950 | 3/1973 | Engstrom.................. | 24/221 K X |
| 3,749,438 | 7/1973 | Loomis et al............ | 24/221 R X |

Primary Examiner—Geo. V. Larkin
Attorney, Agent, or Firm—Oblon, Fisher, Spivak, McClelland & Maier

[57] ABSTRACT

A stud-and-socket fastener (FIG. 1) comprising a triangular socket member (15) having an apertured base (42) and two resilient arms (46,47) which incline towards each other away from the base, and a stud (13) adapted to be inserted through the apertured base of the socket and having diametrically opposed shoulders (33,34) which, when the stud is appropriately orientated with respect to the arms of the socket, can be engaged by the arms to prevent withdrawal of the stud, includes orientating means (37) which, when necessary, co-operate with the socket, upon insertion of the stud, to reorientate the stud with respect to the socket so as to enable the arms to engage the shoulders of the stud. The orientating means is in the form of a cam (37) of greater width than thickness, the width of the cam extending transversely across the leading end of the stud, as inserted into the socket, at an acute angle to the line of the shoulders (33,34).

6 Claims, 15 Drawing Figures

STUD-AND-SOCKET FASTENER

The invention relates to a stud-and-socket fastener and more particularly to an improved stud for one type of such fastener. The type of stud-and-socket fastener concerned is that in which the socket comprises two opposed transversely extending abutments which are resiliently urged towards each other, and the stud comprises a shank having a reduced portion intermediate between its ends, and a leading portion which provides two shoulders on opposite sides of the reduced portion, the thickness of the shank in the reduced portion being reduced in one transverse direction extending across the two shoulders but not in the direction extending between the shoulders, so that the reduced portion has a thickness which is substantially less than the distance across the shoulders, and a width substantially not less than the distance across the shoulders, the stud being engaged with the socket by pushing the leading portion between the two abutments so that the latter are first forced apart to allow the shoulders through and then resiliently close towards each other on to the reduced portion of the stud shank, so that each abutment of the socket engages behind one of the stud shoulders and thereby retains the stud in the socket. Stud-and-socket fasteners of this type are hereinafter referred to as "stud-and-socket fasteners of the type defined" and are well known and widely used e.g. for releasably securing access hatch panels.

Commonly, the stud can be released from the socket by rotating the stud about its axis so that the reduced portion of the stud shank, which is much wider than it is thick, forces the abutments apart to disengage them from the shoulders after which the stud can be pulled out of the socket. It is also possible to arrange for other ways to disengage the socket abutments from the stud shoulders. For example, it has been proposed that the socket abutments could be forced apart by a separate elongated member or 'key' pushed into a longitudinal slot in the shank of the stud.

However, the present invention is primarily concerned with providing positive engagement of the socket abutments with the stud shoulders when the stud is inserted into the socket. It has been found with previously proposed fasteners of the type defined that it is possible to push the stud into the socket with such an angular orientation relative to the socket that the reduced portion of the shank of the stud enters between the socket abutments with its width aligned in a direction extending transversely across the abutments so that the socket abutments are prevented from closing towards each other, the stud shoulders are not aligned with the socket abutments, and the socket abutments cannot either engage the shoulders or exert any turning moment on the stud shank to rotate it into an orientation in which the abutments can engage the shoulders. Consequently, the socket does not retain the stud in this angular orientation.

The present invention provides, in one of its aspects, a stud for a stud-and-socket fastener of the type defined, which stud includes orientating means which, when the stud is inserted into the socket with such an angular orientation relative to the socket that the socket abutments will not engage the shoulders of the stud, will engage and co-operate with part of the socket before the reduced portion enters between the socket abutments, and cause relative rotation between the stud and the socket abutments and thereby relatively reorientate the stud and the socket abutments so that the abutments engage the stud shoulders.

The orientating means may be provided by the leading portion of the stud shank.

In one commonly used form of socket, the abutments are provided by adjacent end portions of two mutually inclined resilient arms. When a stud shank is inserted into the socket, the leading portion of the stud shank enters between the inclined arms to force the adjacent ends apart as aforesaid.

In one form of stud according to the invention for use with such a socket, the orientating means is arranged to engage the inclined arms so that the arms co-operate with the orientating means as the stud shank progressively enters between them and re-orientates the stud shank with respect to the socket abutments as aforesaid.

In one embodiment of the invention, the orientating means comprises a cam disposed forwardly of the stud shoulders. The cam may be a part having a width substantially greater than its thickness, the width of said part extending transversely of the shank in an axial plane at an angle about the stud axis with respect to the plane of the stud shank portion of reduced thickness.

The invention includes a stud-and-socket fastener incorporating a stud having orientating means as aforesaid.

A specific embodiment of the invention will now be described by way of example and with reference to the accompanying drawings, in which.

Figure 1:
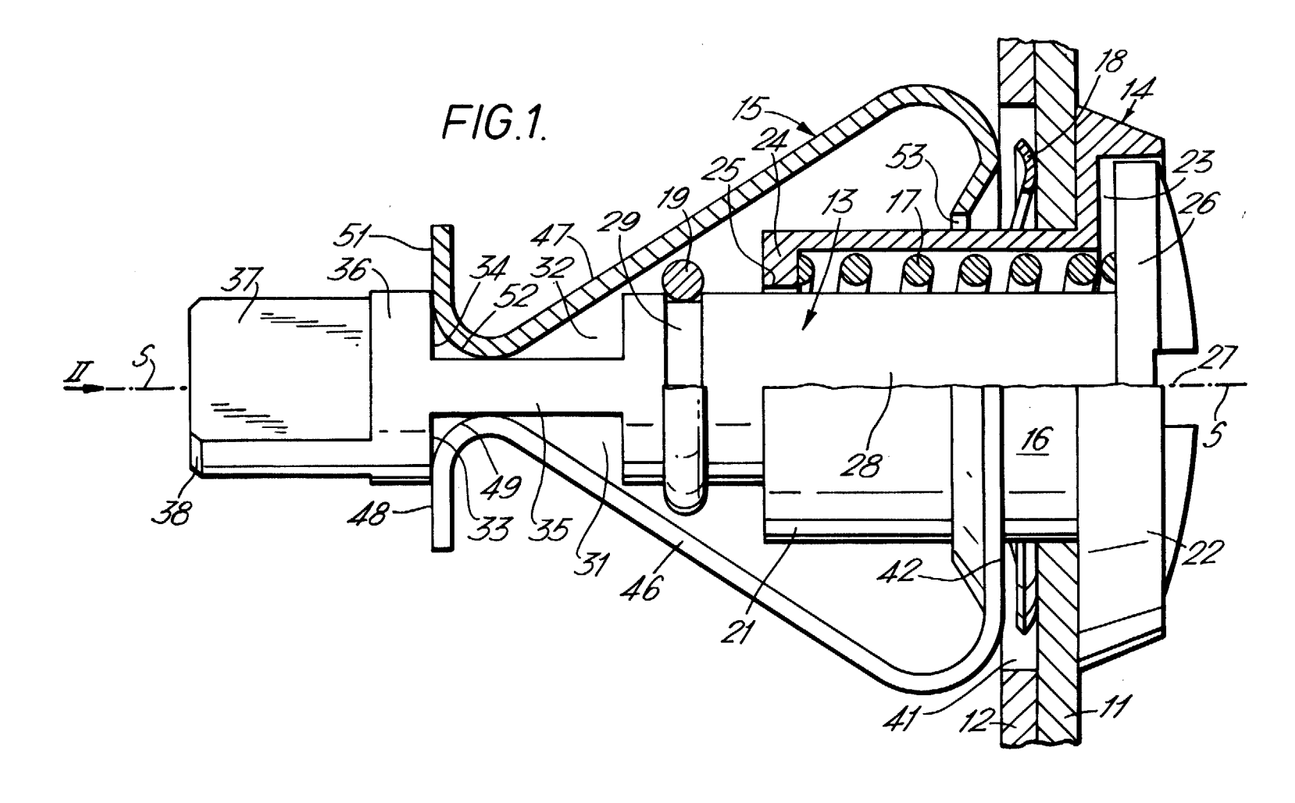
FIG. 1 is a side elevation of stud-and-socket fastener with the stud fully engaged in the socket, some parts being shown in longitudinal axial section.

The stud-and-socket fastener of this example is illustrated in use to secure a panel member 11 to a frame member 12. The fastener has a stud 13 which forms part of an assembly 14 which is carried by the panel 11, and a socket 15 which is carried by the frame 12.

The stud assembly 14 comprises the aforementioned stud 13, a tubular housing 16, a helical compression spring 17, a push-on fix ring 18 and a circlip 19. The housing 16 has a tubular, generally cylindrical, body 21, and, at one end of the body, a radially enlarged head 22 with a circular recess 23 in the end face. In use, the body of the housing is inserted through a suitably close-fitting circular hole in the panel 11 so that the head 22 abuts one side of the panel, and the housing is retained in the panel by means of the push-on fix ring 18 which grips the exterior surface of the cylindrical body 21 and resiliently engages the outer side of the panel. The end of the body 21 remote from the head the exterior surface of the cylindrical body 21 and resiliently engaged the other side of the panel. The end of the body 21 remote from the head 22 has an inwardly extending flange 24 with a central circular aperture 25 of slightly larger diameter than the stud shank.

The stud 13 has an elongated shank and, at one end of the shank, a radially enlarged head 26 of suitable size to be received within the recess 23 in the head 22 of the housing. The head 26 of the stud is provided with a transverse slot 27 for receiving a screw-driver by which the stud can be rotated about its axis S. A stem portion 28 of the stud shank adjacent the head is cylindrical and has a peripheral groove 29 spaced from the head. The stud is assembled with the spring 17 and the housing 16 so that the shank of the stud extends through the coil spring and the tubular housing, the spring being received in the bore of the housing and abutting the flange 24 at one end and abutting the head of the stud at the other end, thereby resiliently spacing the head of the stud from the head of the housing. The stud is retained in the housing by the circlip 19 which is located in the groove 29 and abuts the inwardly flanged end of the housing.

Forwardly of the circlip 19 (i.e. in the direction away from the stud head 26) the stud shank is formed with two diametrically opposed recesses 31, 32. These recesses are similar and symmetrical about the stud axis. The leading end of the recess 31 is bounded by a shoulder 33 of part-circular shape facing towards the head end of the stud, and similarly the leading end of the recess 32 is bounded by a part-circular shoulder 34 facing towards the head end of the stud. The stud shank is thus reduced in thickness by the recesses 31, 32 to provide a diametrical wall portion 35 having a width (in the axial plane W) equal to the thickness of the shank but a thickness (perpendicular to the plane W) substantially less than the thickness of the shank.

Figure 9:
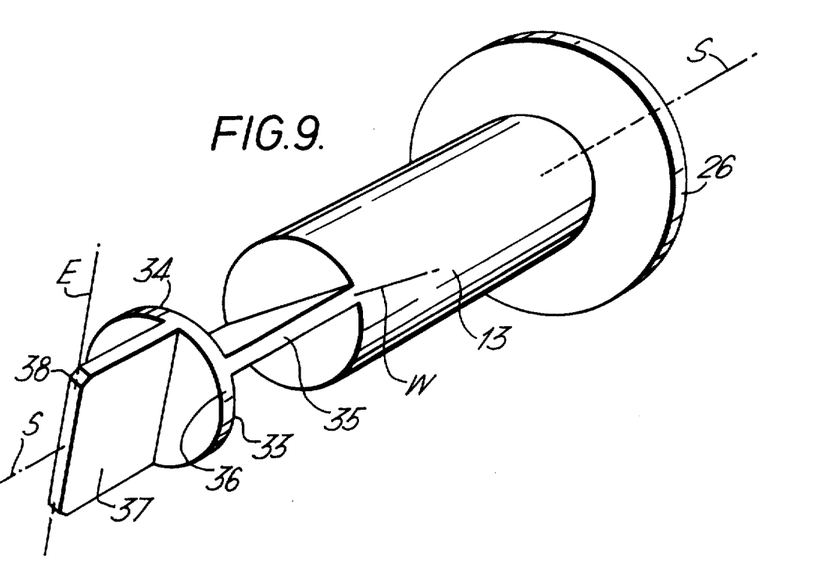
FIG. 9 is a simplified perspective view of the stud.

Forwardly of the recesses 31, 32, the leading portion of stud shank has a short cylindrical portion 36 which is uninterrupted around its circumference and provides the shoulders 32 and 33 facing into the recess. The extreme forward end of the stud is provided by a diametrical orientating cam 37 having a width equal to the full diameter of the cylindrical portion (in the axial plane E) but a much reduced thickness compared with its width, and is generally similar in dimensions to the wall portion 35. Its forward-most end edges are chamfered as shown at 38. The cam 37 is aligned at an angle of rotation about the stud axis relative to the diametrical wall portion 35, and in use of the stud-and-socket fastener co-operates with the socket, when necessary, to orientate the stud with respect to the socket, as will be described later.

The socket of this example is formed of a single elongate piece of spring steel bent to substantially triangular shape so as to have a generally flat base 42 provided with a central aperture 53 and two lateral extensions 43,44 in the middle of the strip. The lateral extensions 43, 44 are each provided with fixing holes 45 through which the socket may be secured to the frame member 12 by suitable rivets, screws or other fastening means. The end portions of the strip form a pair of forwardly extending opposed arms 46, 47 which are inclined towards each other away from the base. The free end portion of each arm (i.e. the end portion remote from the base 42) is bent outwardly about a radius away from the opposite arm so that the two end portions provide a pair of abutments which are parallel to and spaced from the base 42. Thus the arm 46 has an abutment joined to the inclined main part of the arm by a curved lead-in portion 49 and providing an abutment face 48, whilst the other arm 47 has an abutment providing an abutment face 51 joined to the main part of the arm 47 by a curved lead-in portion 52. The arms 46, 47 are such that they are resiliently urged towards each other by the resilience of the steel strip from which the socket is made, the two curved portions 49, 52 meeting each other in resilient contact (if there is no obstruction between them) along an axis T perpendicular to the axis S of the stud when the latter is engaged in the socket as shown in FIGS. 1 and 2.

The frame member 12 is provided with a circular aperture 41 into which the push-on fix ring 18 of the stud assembly can enter when the panel member 11 is secured to the frame member. The socket 15 is secured to the frame member so that the central aperture 53 of its base overlies the aperture 41 in the frame member by any suitable means, as, for example, by riveting or screwing into the frame member through the fixing holes 45.

Figure 2:
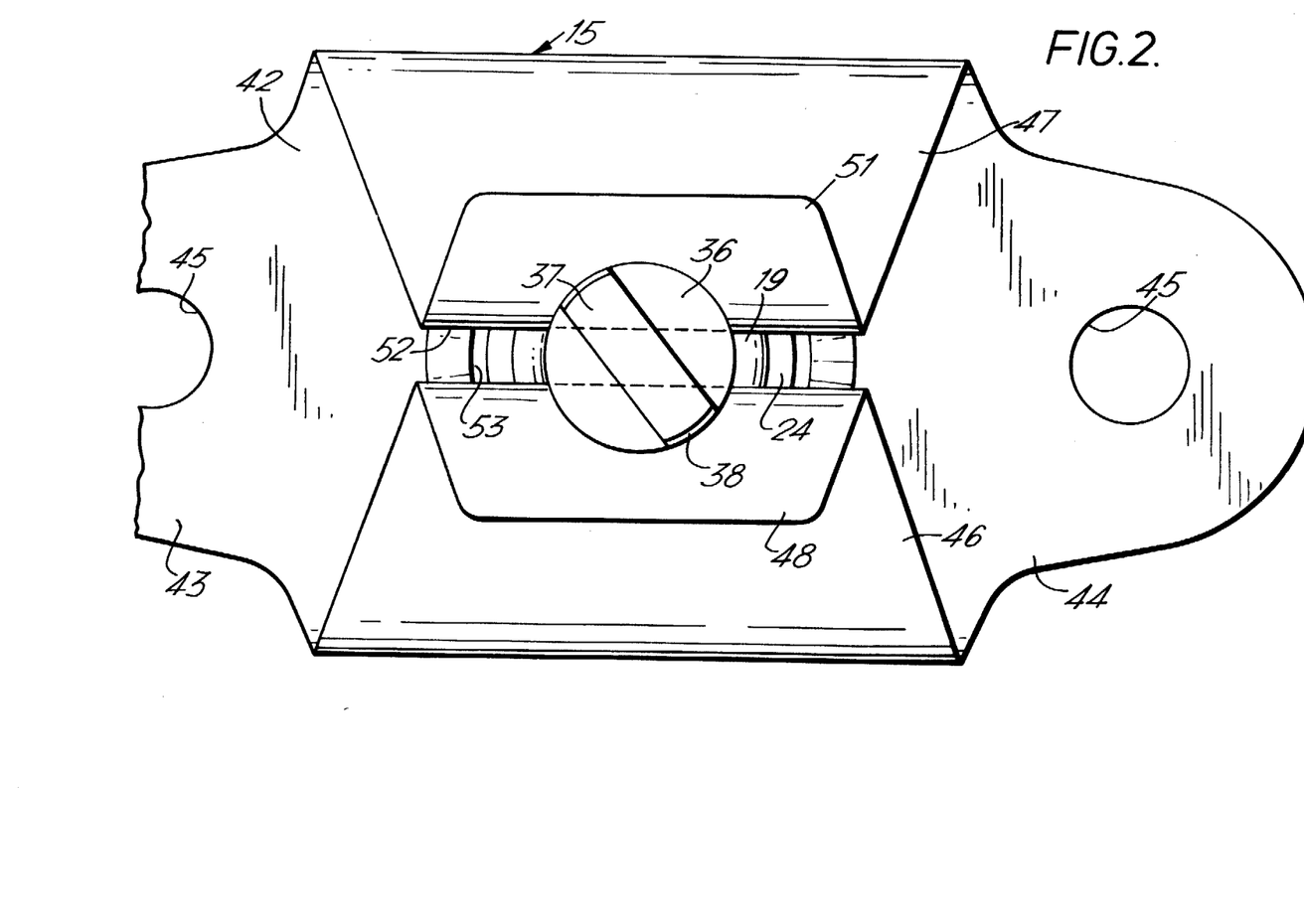
FIG. 2 is an end elevation in the direction of the arrow II in FIG. 1.

FIGS. 1 and 2 illustrate the stud-and-socket fastener in the engaged or locked position. It will be seen that the stud shank has been pushed in to the socket so that the portion 36 has passed beyond the ends of the arms 46, 47. These arms have closed towards each other so that the curved portions 49, 52 lie in line contact with opposite transverse faces of the diametrical wall portion 35 and are spaced apart by the thickness of the wall portion 35. Part of each of the abutment faces 48, 51 is in contact with part of the shoulder 33, 34 respectively thus preventing the stud from being withdrawn from the socket. The spring 17 is under compression and tends to urge the stud out of the socket, and consequently keeps the panel member 11 in contact with the frame member 12. It should be noted from FIG. 1 that the radius of the two curved intermediate portions 49, 52 of the socket arms is just sufficiently small, in relation to the depth of each stud shoulder 33, 34, that part of each flat abutment face 48, 51 engages the outer part of the associated stud shoulder 33, 34. Consequently there is no tendency for the stud shoulders to urge the socket arms 46, 47 apart.

The stud may be unlocked or disengaged from the socket by rotating it about its axis S (by means of a screwdrivier blade or other suitable implement inserted in the head slot 27) so that the width of the diametrical wall portion 35 of the stud comes to lie in a direction across the arms and forces the arms 46, 47 apart sufficiently to allow the cylindrical portion 36 of the stud to be pulled from between the arms by or with the aid of the urging of spring 17.

The action of the stud orientating means, which forms the subject of the present invention, in obtaining correct engagement of the stud with the socket will now be described. Reference is particularly directed towards FIGS. 3, 4, 5, 6, 7 and 8. These figures illustrate somewhat schematically and in simplified form the relevant parts of the stud-and-socket fastener illustrated in FIGS. 1 and 2, and like parts are similarly numbers.

Figures 3A, 4A:
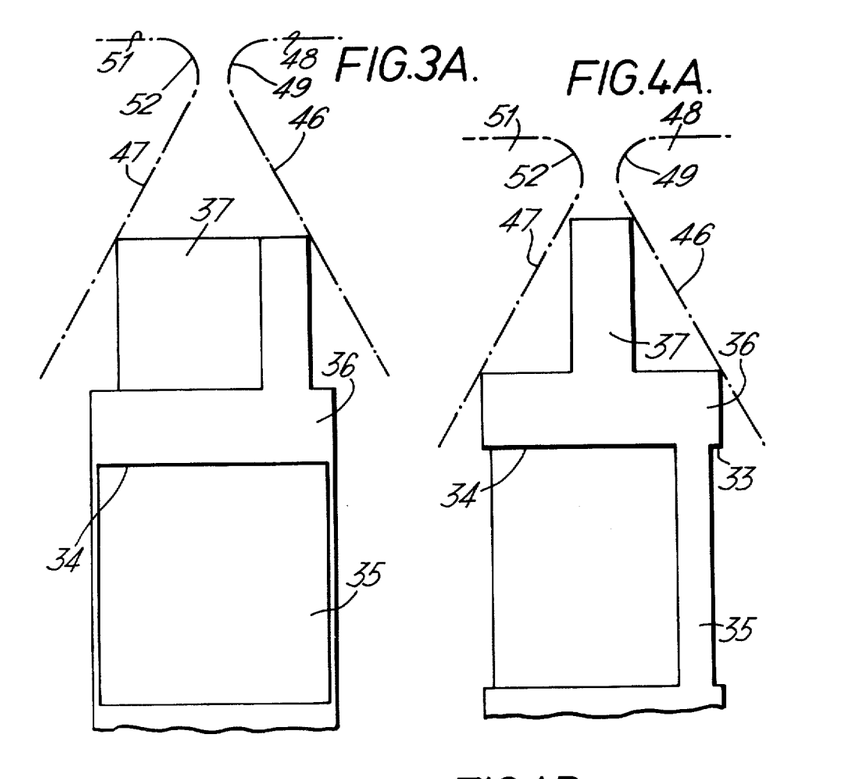
FIGS. 3A and 3B, 4A and 4B, 5A and 5B are pairs of simplified diagrammatic side and end elevations respectively, illustrating successive stages in a typical example of the action of the orientating means.
Figure 3B:
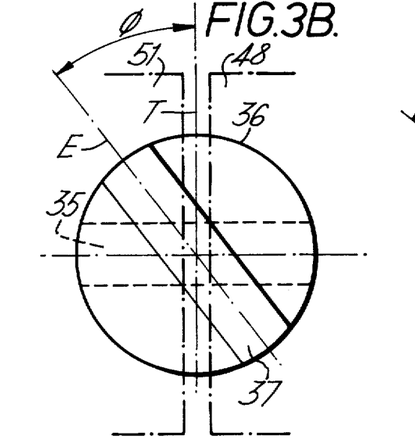
Figure 4B:
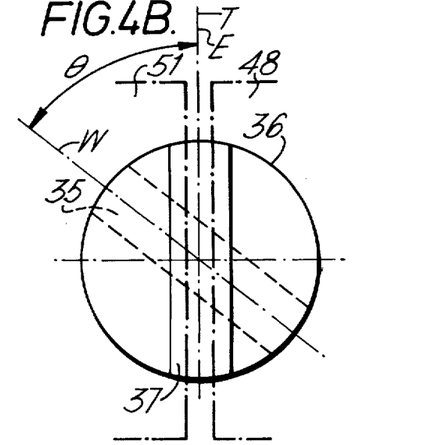
Figure 5A:
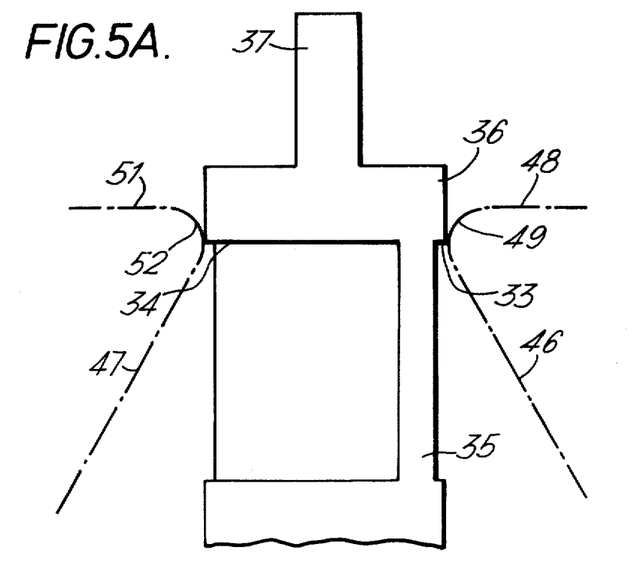
Figure 5B:
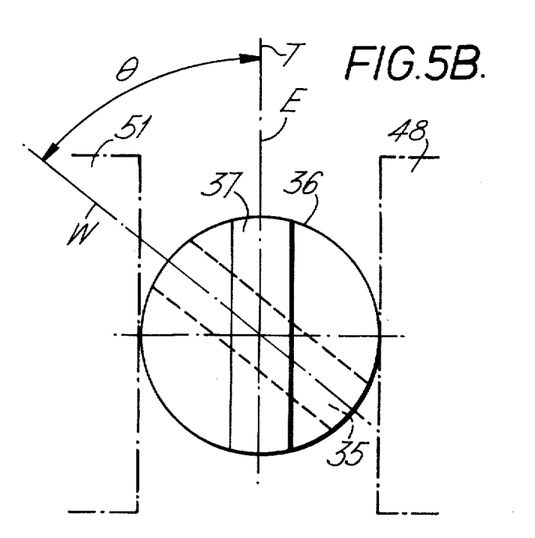

FIGS. 3A and 3B illustrate what happens when the stud is being pushed into the socket with the transverse plane E of the orientating cam 37 at any angle $\phi$ to the transverse axis T of the abutments, where $\phi$ may be any angle from 0° up to substantially 90°. As the stud is pushed in towards the inclined arms 46, 47 of the socket, the first parts of the stud to contact the socket are the diametrically opposite edges at the leading end of the cam 37 which contact the inclined socket arms 46, 47 respectively. The forward thrust on the stud and the inclination of the arms 46, 47 to the stud axis cause the stud to rotate about its axis as it moves forwards, so that the plane E of the cam progressively aligns itself more nearly to the axis T of the transverse abutments 48, 51. This continues until this alignment is complete, as illustrated in FIGS. 4A and 4B. In this angular orientation, the transverse plane W of the wall portion 35 of the stud is at an angle $\theta$ to the transverse axis T of the abutments, the angle $\theta$ being, substantially, greater than 0° and less than 90° and, in this embodiment, is 52°. As the stud is pushed further into the socket, it retains the same angular orientation, the arms 46, 47 being forced apart by the cylindrical portion 36, as illustrated in FIGS. 5A and 5B, until the intermediate cylindrical portion 36 passes beyond the abutments. The arms then exert their resilient urging action upon opposite outer edges of the diametrical wall portion 35 of the stud. The relative angular orientation between the wall portion 35 and the transverse direction of the portions 49, 52 of the sprung arms is such that the arms rotate the stud until the plane W of the wall portion 35 is in alignment with the transverse axis T along which the abutments normally close, thus ensuring that the abutment faces 48, 51 can engage behind the shoulders 33, 34 on the cylindrical portion 36. This is the position shown in FIGS. 8A and 8B (and in detail in FIGS. 1 and 2).

In prior art fasteners of the kind defined, there has been no transversely extending orientating cam 37 on the stud. Consequently, if a conventional stud is offered up to the socket in an angular orientation in which plane W of the wall portion 35 extends at right angles to the transverse axis T of the abutments (i.e. in the particular position shown in FIGS. 3A and 3B) then the stud simply wedges the abutment members apart and they are supported in the open position by the wall portion 35 extending perpendicularly across the gap between them. The abutments 48, 51 cannot then close together to engage with the shoulders 33, 34, nor can the socket arms exert any turning moment on the stud to bring it into the correct angular orientation. Consequently the stud cannot be locked or retained in the socket.

Figures 6A, 6B:
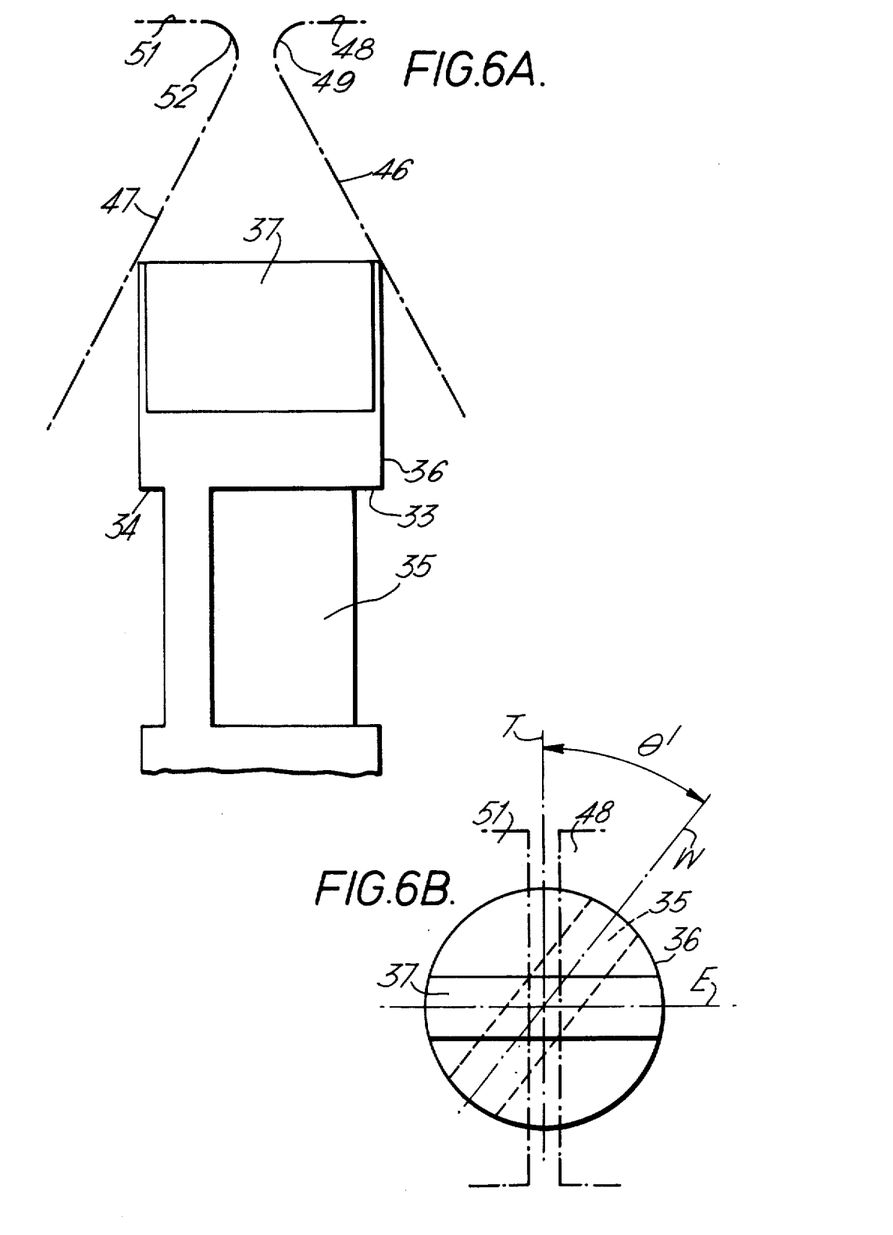
FIGS. 6A and 6B and 7A and 7B are pairs of side and end elevations illustrating stages in the action during a special case of angular orientation of the stud relative to the socket.
Figure 7A:
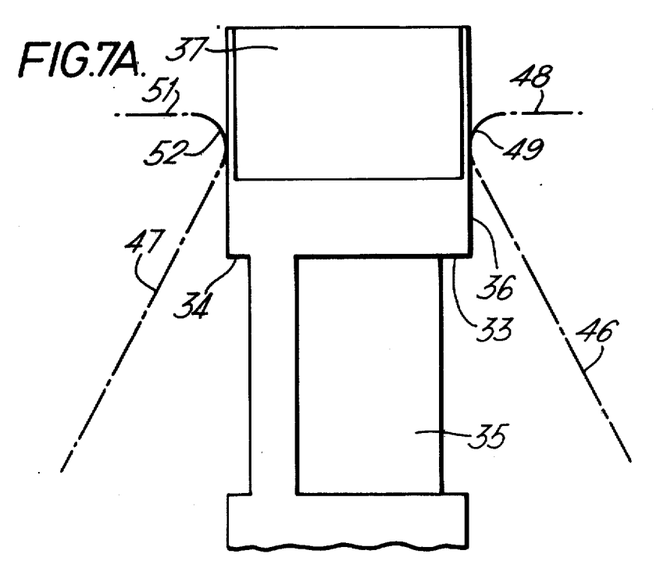
Figure 7B:
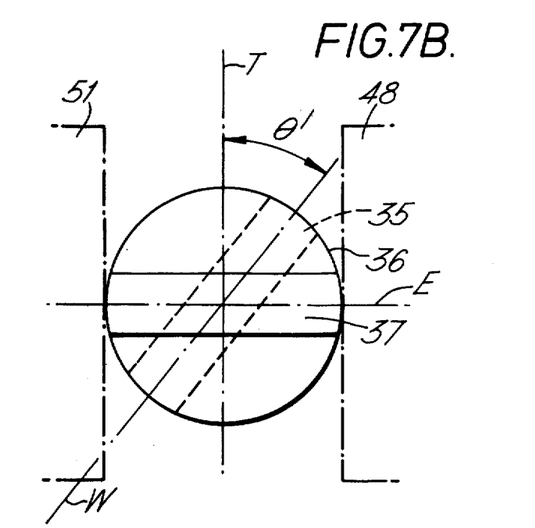
Figures 8A, 8B:
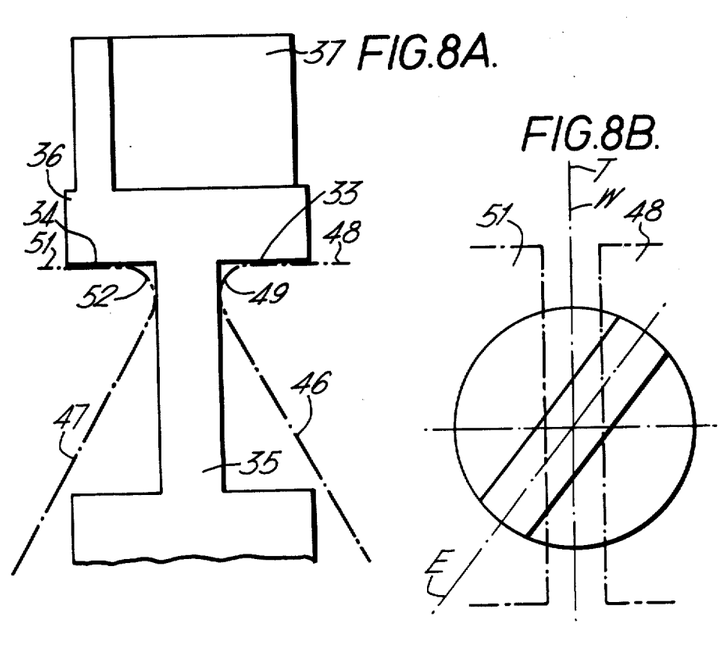
FIGS. 8A and 8B are side and end elevations respectively, illustrating the final position of the stud and socket when fully engaged (i.e. similar to FIGS. 1 & 2 respectively)

With the improved fastener of the present invention, it may be that the stud is offered up to the socket with the plane E of the transversely extending cam 37 perpendicular to the transverse axis T of the abutment members, as is illustrated in FIGS. 6A and 6B. In this case, the resilient arms of the socket cannot exert any turning moment on the cam 37, and therefore the stud is not caused to rotate about its axis as it is pushed in between the socket arms as illustrated in FIGS. 7A and 7B. However, the wall portion 35 is at an angle $\theta^1$ (equal to 90° minus $\theta$, and which in this embodiment is 38°) to the line of transverse extent of the abutment faces, and consequently, when the cylindrical portion 36 of the stud has passed beyond the abutment faces so that the latter close together, the resilient pressure of the arms can rotate the stud to bring the wall portion 35 in to the correct alignment.

In order that the socket arms can exert sufficient turning moment on the stud in each of the orientations illustrated and described in FIGS. 3A and 3B, and in FIGS. 6A and 6B, it is necessary that the turning moments which can be applied by the spring arms to the stud in each of the two positions should both be as high as possible. If the cam 37 and the wall portion 35 each had no thickness, then this would be achieved by making the angle $\theta$, between the transverse plane E of the cam 37 and the transverse plane W of the wall portion 35, equal to 45°, so that $\theta = \theta^1 = 45°$. However, since both of those parts 35 and 37 have a finite thickness, this theoretical angle is modified and an optimum angle which enables the optimum torque to be obtained in both cases is selected. The value of the optimum angle depends upon the thickness of each of the parts 35 and 37 and the diameter of the stud. In this example, in which the diameter of the stud was 0.200 inches and the thickness of each of the cam 37 and the wall portion 35 was 0.050 inches, it was found that the optimum angle $\theta$ between the transverse planes of the two parts 35 and 37 was 52°.

The invention is not restricted to the details of the foregoing example. For instance, the resilient arms of the socket need not necessarily close completely together when there is no obstruction between them. The circlip 19 may be replaced as a means of retaining the stud in the housing by lateral projections provided on the stud shank. Such projections may be formed by staking, laterally crimping or otherwise deforming the shank of the stud to form lateral projections. In particular, such projections may be provided by staking the wall portion near the edges of its transverse surfaces to form projections which will engage the flange 24 of the stud housing. The orientating means on the stud may take any convenient form.

I claim:

1. A stud for use with a socket of the kind comprising two transversely extending abutments which are resiliently urged towards each other, said stud comprising:

a shank having a stem portion, a leading portion, and a reduced portion joining the stem and leading portions, said leading portion providing two shoulders on opposite sides of the reduced portion, and the thickness of the shank in the reduced portion being reduced in a transverse direction extending across the two shoulders, and orientating means for orientating said stud relative to a socket when said stud is inserted within a socket, whereby, when the stud is inserted into a socket of the said kind with such an angular orientation relative to the socket that the socket abutments will not engage the shoulders of the stud, said orientating means will engage and co-operate with a part of the socket before the reduced portion enters between the socket abutments so as to relatively reorientate the stud and the socket abutments so that the socket abutments can engage the shoulders of the stud.

2. A stud according to claim 1, wherein the orientating means is provided by the leading portion of the stud.

3. A stud according to claim 1, wherein the orientating means comprises a cam provided by the leading portion, said shoulders being disposed between the cam and said reduced portion.

4. A stud according to claim 3, wherein the cam is a part having a width substantially greater than its thickness, said part extending transversely of the shank and generally in an axial plane arranged at an angle with respect to an axial plane in which the width of the reduced portion extends across the shank.

5. A stud according to claim 4, wherein the said angle is substantially greater than 0° and substantially less than 90°.

6. A stud according to claim 1, which stud forms part of a stud assembly, said assembly including a tubular housing through which the stem portion of the stud shank extends, said stem portion having a head remote from said reduced portion and said reduced portion providing a lateral projection, said head and said lateral projection being operative to retain the housing on the stem portion of the stud shank.

* * * * *